United States Patent [19]
Slat

[11] Patent Number: 5,736,093
[45] Date of Patent: Apr. 7, 1998

[54] METHOD FOR MAKING A MULTI-LAYER BLOW MOLDED CONTAINER

[75] Inventor: William A. Slat, Brooklyn, Mich.

[73] Assignee: Plastipak Packaging, Inc., Plymouth, Mich.

[21] Appl. No.: 588,519

[22] Filed: Jan. 18, 1996

[51] Int. Cl.⁶ ......................................... B29C 49/22
[52] U.S. Cl. ............................... 264/513; 264/135
[58] Field of Search ............................ 264/512, 513, 264/515, 291, 292, 132, 134, 135

[56] References Cited

U.S. PATENT DOCUMENTS

| | | | |
|---|---|---|---|
| 3,396,062 | 8/1968 | White | 264/512 |
| 3,519,514 | 7/1970 | Ignell et al. | 264/512 |
| 3,717,544 | 2/1973 | Valyi | |
| 3,719,735 | 3/1973 | Valyi | |
| 3,954,923 | 5/1976 | Valyi | 264/513 |
| 4,067,944 | 1/1978 | Valyi | |
| 4,778,551 | 10/1988 | Coffman | 264/512 |
| 5,443,766 | 8/1995 | Slat et al. | 264/513 |

*Primary Examiner*—Catherine Timm
*Attorney, Agent, or Firm*—Brooks & Kushman P.C.

[57] ABSTRACT

A method for making a multi-layer blow molded container (10) is performed by spraying a sheet (34) of virgin polyethylene terephthalate with a pattern of barrier layer spots (36) prior to thermoforming at each barrier layer spot to provide a preform liner (24) about which polyethylene terephthalate (26) is injection molded to provide a multi-layer preform (10) from which the container is blow molded.

12 Claims, 4 Drawing Sheets

METHOD FOR MAKING A MULTI-LAYER BLOW MOLDED CONTAINER

TECHNICAL FIELD

This invention relates to a method for making a multi-layer blow molded container in a cost efficient yet effective manner.

BACKGROUND ART

Prior blow molded containers have been made from multi-layer preforms so as to be capable of utilizing a barrier material that is less permeable to gas than the material of the rest of the container. U.S. Pat. No. 4,391,861 Nilsson discloses a multi-layer preform for use in blow molding and having inner and outer "part-preforms" that are disclosed as being made by injection molding or extrusion and this patent also discloses the use of reprocessed plastic for one of the part-preforms.

U.S. Pat. Nos. 3,717,544 Valyl, 3,719,735 Valyl and 4,067,944 Valyl disclose multi-layer blow molded containers made from preforms having an inner layer provided by a liner about which an outer layer is formed by injection molding. The U.S. Pat. No. 3,717,544 Valyl discloses the liners as being made by a thermoforming process wherein a vacuum is applied to a female mold to deform a heated plastic sheet to the shape of the mold.

Barrier materials which are utilized for multi-layer blow molded containers are usually more expensive than the material which is utilized for the rest of the container. These more expensive barrier materials thus add to the cost of the resultant product. Also, if the barrier materials are part of any scrap material that results, there is not only the cost lost but also potential problems in the recyclability of the scrap since it is then of two different materials as opposed to being of a single material.

DISCLOSURE OF INVENTION

An object of the present invention is to provide an improved method for making a multi-layer blow molded container with a barrier material in a cost efficient but nevertheless effective manner.

In carrying out the above object, the method for making a multi-layer blow molded container according to the present invention is carried out by spraying a sheet of virgin polyethylene terephthalate with a pattern of barrier layer spots that cover less than the entire sheet. Thermoforming of the sheet of polyethylene terephthalate at each barrier layer spot is performed to provide a preform liner having a virgin polyethylene terephthalate layer and a barrier layer. Injection molding an outer layer of polyethylene terephthalate around the exterior of the liner is performed to provide a multi-layer preform. Blow molding of the multi-layer preform provides the multi-layer blow molded container.

The manner in which the more expensive barrier material is provided as barrier layer spots eliminates waste and thereby reduces the resultant cost of the multi-layer blow molded container.

In accordance with the preferred practice of the method, the barrier layer spots are provided to the sheet of virgin polyethylene terephthalate at spaced locations from each other which allows the thermoforming to be performed to provide the preform liner without having the scrap virgin polyethylene terephthalate containing any barrier layer material that can adversely affect the recyclability of the scrap.

These barrier layer spots can be made of different materials including polyethylene naphthalate, polyvinylidene chloride, nylon, ethylene-vinyl alcohol and combinations of these materials.

The virgin polyethylene terephthalate layer and the barrier layer of the liner can be positioned in different relationships with respect to each other. In one practice of the method, the virgin polyethylene terephthalate layer is positioned to define the interior surface of the blow molded container and cooperates with the injection molded outer layer of polyethylene terephthalate to sandwich the barrier layer therebetween. In another practice of the method, the barrier layer is positioned to define the interior surface of the blow molded container and cooperates with the injection molded outer layer of polyethylene terephthalate to sandwich the virgin polyethylene terephthalate layer therebetween.

In an alternate practice of the invention, the method is performed utilizing a second sheet of resin to cooperate with the sheet of virgin polyethylene terephthalate to sandwich the barrier layer spots therebetween in preparation for the thermoforming of the liner. This second sheet of resin may be from different materials including polyethylene terephthalate, polyethylene naphthalate and combinations thereof and may also be either virgin or post consumer recycled resin.

The method for making the multi-layer blow molded container is performed by axially stretching the preform to provide biaxial orientation of the multi-layer blow molded container.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
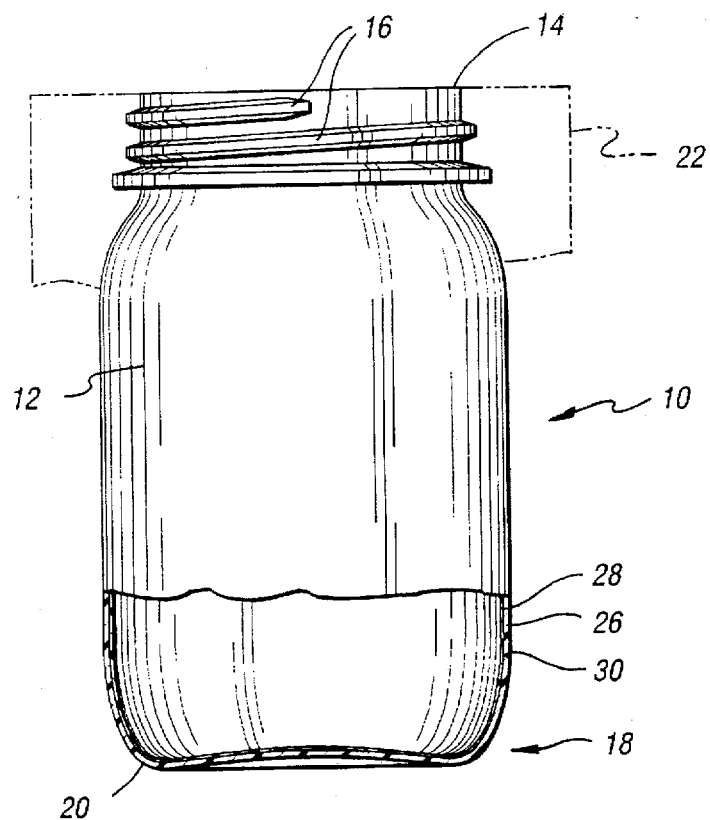
FIG. 1 is a partially broken away elevational view of a multi-layer blow molded container made by the method of this invention.
Figure 2:
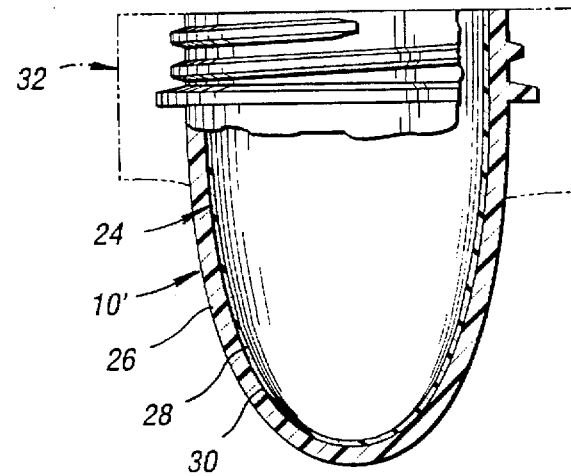
FIG. 2 is a partially broken away elevational view of a multi-layer preform from which the container is blow molded.

With reference to FIG. 1 of the drawings, a multi-layer blow molded container indicated by 10 is made by the method of the present invention as is hereinafter more fully described and includes a body portion 12 as well as an upper dispensing end 14 through which the contents of the container are filled and ultimately dispensed. Retainers in the form of closure threads 16 are provided on the upper dispensing end 14 to hold an unshown closure cap. A lower freestanding base 18 of the container 10 has a lower surface 20 at which the container is supported in a freestanding manner upon resting on a suitable support surface. This container 10 is blow molded within a schematically and partially indicated mold 22 from a multi-layer preform 10' which as shown in FIG. 2 includes an inner liner 24 and an injection molded outer layer 26 of polyethylene terephthalate. The inner liner 24 as is hereinafter more fully described includes a virgin polyethylene terephthalate layer 28 and a barrier layer 30. The preform liner 24 is inserted within an injection mold 32 after manufacturing as is hereinafter more fully described for injection molding of the outer layer 26 of polyethylene terephthalate. It will be noted that the multi-layer preform 10' has a shorter height than the finally blow molded container 10 illustrated in FIG. 1 in that it is axially stretched during the blow molding process to provide biaxial orientation that strengthens the container.

Figure 3:
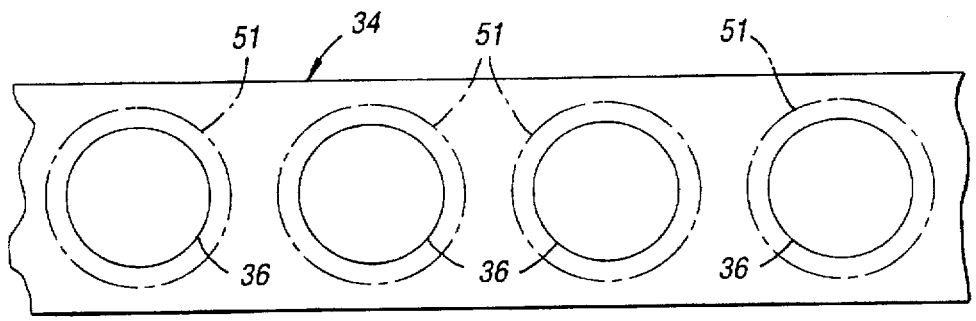
FIG. 3 is a top plan view of a sheet of virgin polyethylene terephthalate on which a pattern of barrier layer spots are provided in connection with thermoforming of a preform liner.
Figure 4:
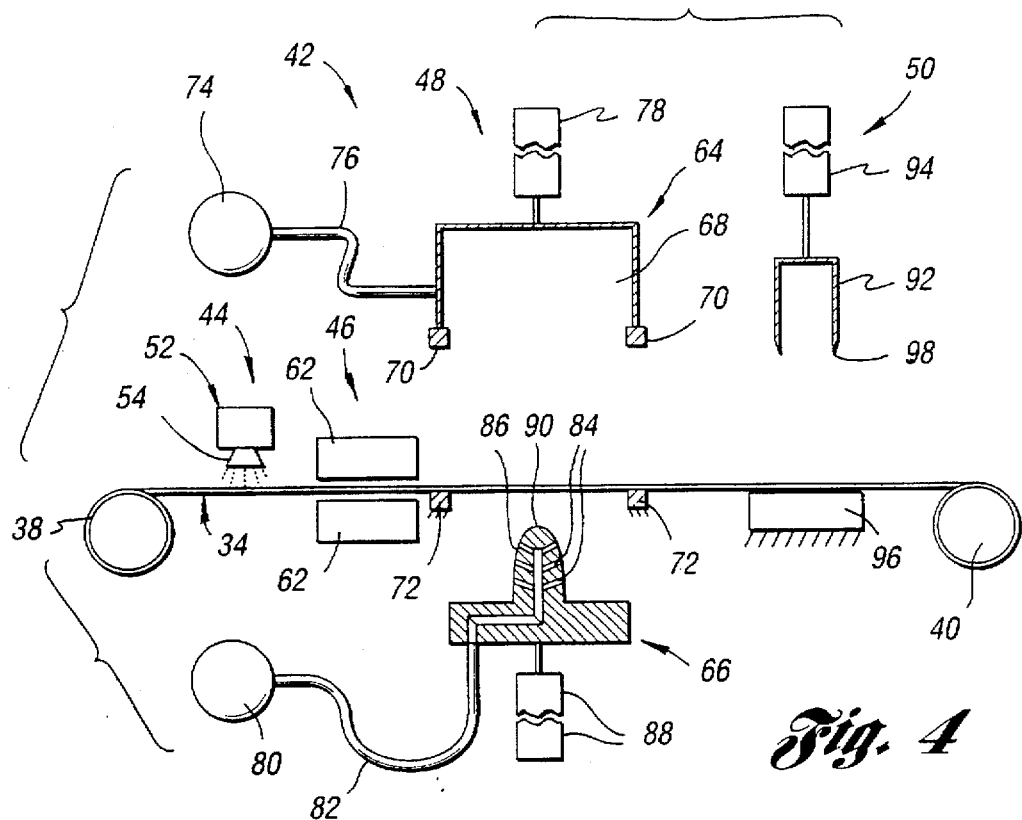
FIG. 4 is an elevational view illustrating apparatus utilized to thermoform the preform liner and illustrated at an initial stage of a cycle of operation.
Figure 9:
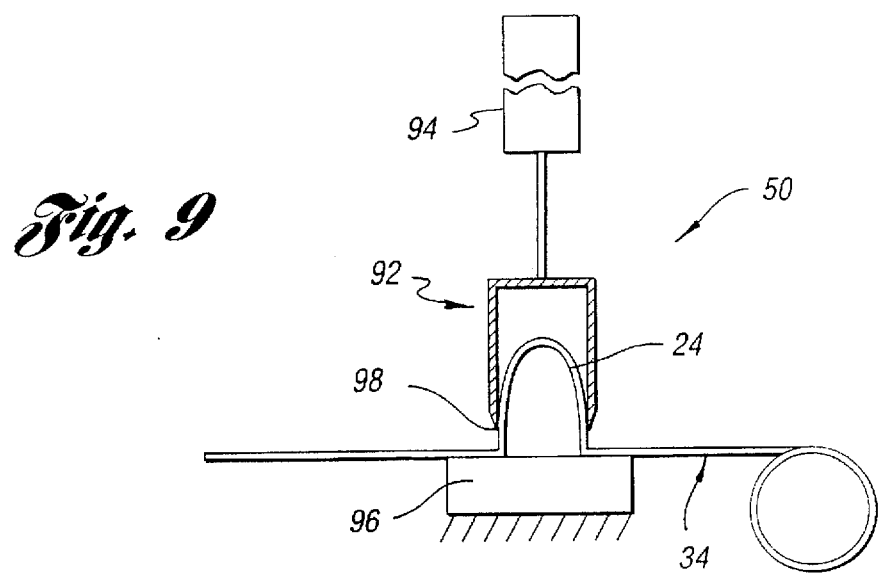
FIG. 9 is a view illustrating operation of a trimming station where the preform liner is cut from the sheet of virgin polyethylene terephthalate.

With reference to FIG. 3, the preform liner 24 is manufactured from a sheet 34 of virgin polyethylene terephthalate with a pattern of barrier layer spots 36 that cover less than the entire sheet. This virgin polyethylene terephthalate sheet 34 as shown in FIG. 4 is provided by a supply roll 38 and moved toward the right therefrom to a scrap roll 40 through a preform liner manufacturing system 42. This preform liner manufacturing system 42 includes a barrier spot station 44, a heating station 46, a thermoforming station 48, and a trimming station 50 at which the completed liner is trimmed from the rest of the sheet 34 as illustrated in FIG. 9.

The method for making the multi-layer blow molded container 10 illustrated in FIG. 1 is thus commenced by providing the sheet 34 of virgin polyethylene terephthalate with the pattern of barrier spots 36 that cover less than the entire sheet. Thermoforming of the sheet of virgin polyethylene terephthalate at each barrier spot 36 is then performed as set forth by the hereinafter described operation of the preform liner forming system 42 and as shown by the progression from FIG. 4 through 8 to the trimming performed in FIG. 9. Thereafter, the injection molding of the outer layer 26 as previously described in connection with FIG. 2 provides the preform 10', which is then blow molded to provide the multi-layer container 10 as previously described in connection with FIG. 1.

As illustrated in FIG. 3, the barrier layer spots 36 are provided to the sheet 34 of virgin polyethylene terephthalate at spaced locations from each other. More specifically, these barrier layer spots 36 are indicated as being round and are located within round phantom line indicated circles 51 corresponding to the required area of the sheet to thermoform each preform liner as is hereinafter more fully described.

As illustrated in FIG. 4, the barrier layer spots are provided at the barrier station 44 by a spray apparatus 52 that provides a spray 54 of the barrier material. As is hereinafter more fully described in connection with FIGS. 12-15, it is also possible to provide the barrier layer spots as a solid to the sheet 34 of virgin polyethylene terephthalate since some materials utilized for the barrier material may not be readily sprayable. Different types of materials that may be used for providing the barrier spots include polyethylene naphthalate, polyvinylidene chloride, nylon, ethylene-vinyl alcohol and combinations of these materials. Furthermore, as illustrated, the barrier layer spray apparatus 52 is located on the top side of the sheet 34 of virgin polyethylene terephthalate such that the barrier layer is on the exterior of the preform liner 24. As such, the virgin polyethylene terephthalate layer 28 as shown in FIG. 2 is positioned to define the interior surface of the blow molded container and cooperates with the injection molded outer layer 26 of polyethylene terephthalate to sandwich the barrier layer therebetween which is desirable since some barrier layers tend to absorb water from the atmosphere and thus function best if hermetically sealed. Furthermore, such construction allows the virgin polyethylene terephthalate layer 28 to contact the container contents which is desirable in that this material is known as effective in such usage where some barrier materials may not be.

Figure 10:
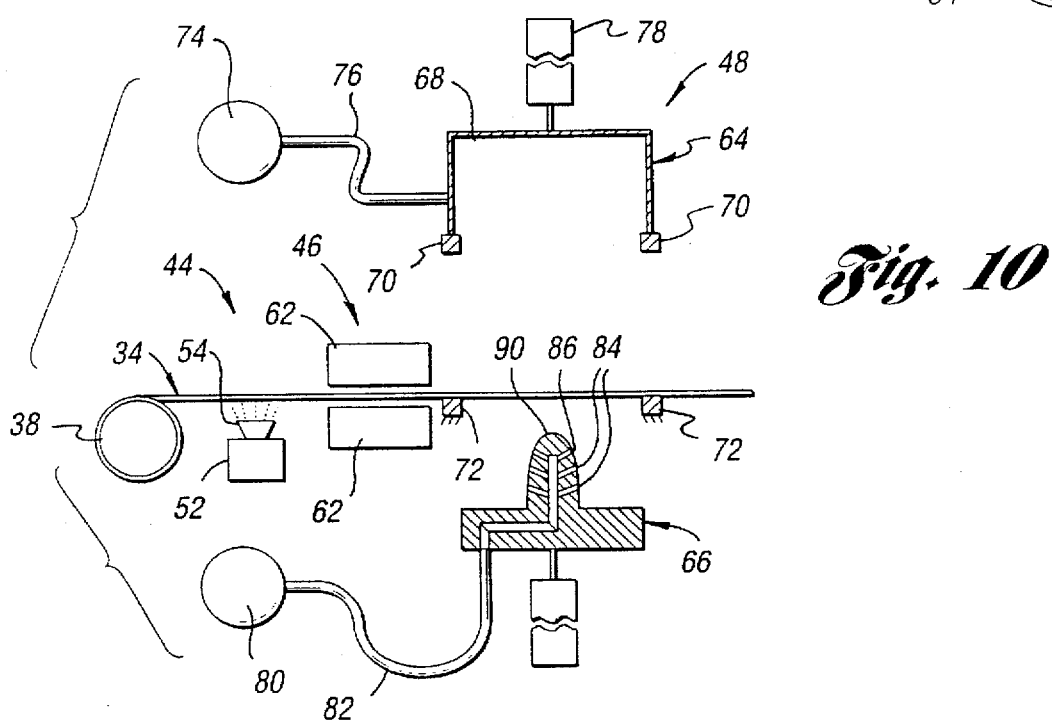
FIG. 10 is a partial view similar to FIG. 4 of another version of the thermoforming apparatus wherein the barrier layer spots are provided to the interior of the preform liner as opposed to its exterior as illustrated in FIGS. 4–8.

In another practice of the method illustrated in FIG. 10, the spray apparatus 52 provides the spray 54 to the bottom side of the sheet 34 of virgin polyethylene terephthalate such that the barrier layer then is located on the interior of the resultant preform liner. With this practice of the method, the barrier layer 30 is thus positioned to define the interior surface of the blow molded container 10 and cooperates with the injection molded outer layer 26 of polyethylene terephthalate of the preform 10' to sandwich the virgin polyethylene terephthalate layer 28 therebetween.

Figure 11:
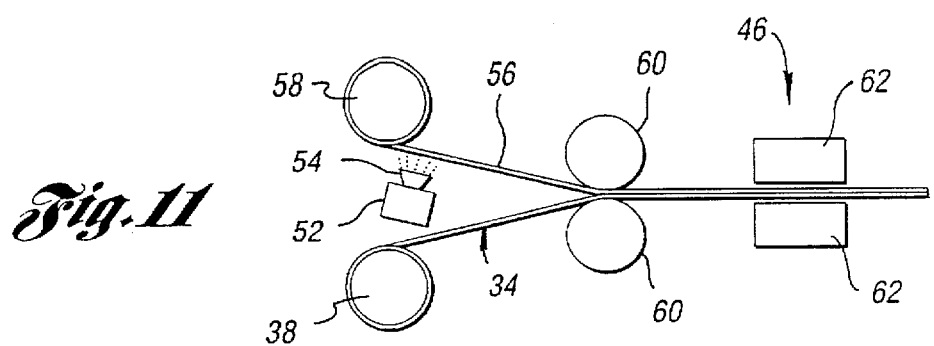
FIG. 11 illustrates a further alternative wherein a second sheet of resin is provided to cooperate with the sheet of virgin polyethylene terephthalate to sandwich the barrier layer spots therebetween.

As illustrated in FIG. 11, a second sheet 56 of a suitable resin is provided from a supply roll 58 and a pair of positioning rolls 60 rotatably engage the two sheets so as to provide an interface therebetween upon movement from the supply rolls toward the right. The spray apparatus 52 provides the barrier layer spray 54 to one of the sheets 34 or 56 at the surface thereof that interfaces with the other sheet after passage through the positioning rolls 60. This type of operation sandwiches the barrier spots between the two layers of the ultimately formed preform liner 24. The second sheet 56 of resin utilized may be of different materials including polyethylene terephthalate and polyethylene naphthalate and may be either virgin resin or post consumer recycled resin.

Manufacturing of the preform 10' illustrated in FIG. 1 can be performed by injection molding either virgin or post consumer recycled polyethylene terephthalate around the liner 24 to provide the outer layer 26 of polyethylene terephthalate. Furthermore, as previously mentioned, the preform 10' is axially stretched during the blow molding within the schematically illustrated mold 22 in FIG. 1 to provide biaxial orientation of the multi-layer blow molded container 10.

The operation of the preform liner manufacturing system 42 will now be more fully described with reference to FIG. 4 which shows that the heating station 46 includes at least one heater 62 and preferably includes a pair of opposed heaters 62 as illustrated between which the resin sheet 34 of virgin polyethylene terephthalate is moved for heating. These heaters 62 may be of any suitable type such as gas, electric resistance, etc. to provide sufficient heating of the sheet 34 of virgin polyethylene terephthalate for softening in preparation for the thermoforming.

With continuing reference to FIG. 4, the thermoforming station 48 is located downstream from the heating station 46 and includes a vacuum enclosure 64 located above the sheet 34 of virgin polyethylene terephthalate adjacent its upper surface. The thermoforming station 48 also includes a male vacuum mold 66 located below the sheet 34 of virgin polyethylene terephthalate adjacent its lower surface. As is hereinafter more fully described, the vacuum enclosure 64 cooperates with the male vacuum mold 66 to provide the thermoforming of the preform liner 24 from the heated sheet 34 of virgin polyethylene terephthalate.

Figure 5:
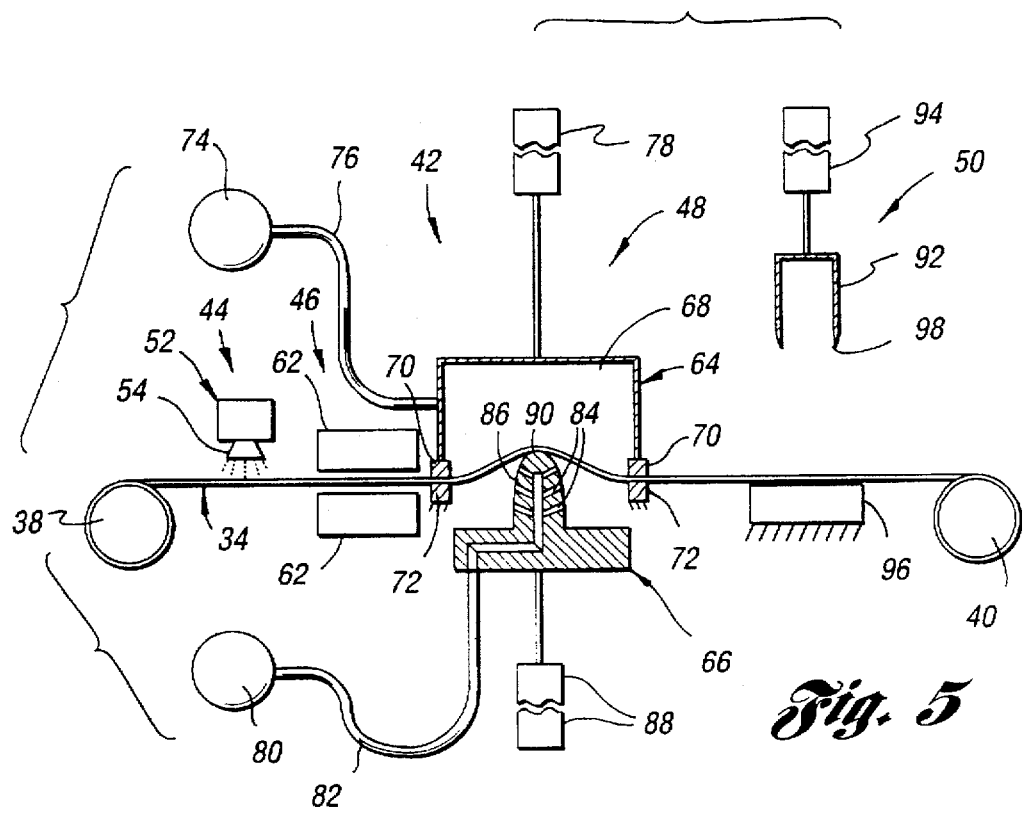
FIG. 5 is a view similar to FIG. 4 at a later stage of the thermoforming cycle.

The vacuum enclosure 64 of the thermoforming station 48 as shown in FIG. 4 defines a vacuum chamber 68 and has a lower peripheral seal 70. The sheet 34 of virgin polyethylene terephthalate is movable over a stationary peripheral support 72 that conforms in shape to the lower seal 70 of the vacuum enclosure 64. A vacuum source 74 is communicated by a flexible conduit 76 with the vacuum chamber 68 to draw a vacuum within the vacuum chamber 68 during the thermoforming operation. An actuator 78 of any suitable type moves the vacuum enclosure 64 toward the stationary peripheral support 72 such that its lower seal 70 cooperates with the peripheral support to clamp the sheet 34 of virgin polyethylene terephthalate and seal the chamber 68. A vacuum is then drawn as shown in FIG. 5 within the vacuum chamber 68 such that the sheet 34 of virgin polyethylene terephthalate is formed to an upwardly domed shape.

The male vacuum mold 66 of the thermoforming station 48 is located below the sheet 34 of virgin polyethylene terephthalate and includes a vacuum source 80 that is communicated by a suitable flexible conduit 82 with passages 84 of the male vacuum mold. These passages 84 extend to the male mold surface 86 which conforms to the inner surface of the formed liner 24 shown in FIG. 2. The male vacuum mold 66 with reference back to FIG. 4 includes an actuator 88 for providing upward and downward movement thereof and during the initial part of the cycle is moved upwardly toward the sheet 34 of virgin polyethylene terephthalate as shown in FIG. 5. A distal end 90 of the mold surface 86 engages the lower surface of the upwardly formed sheet 34 of virgin polyethylene terephthalate as shown during the thermoforming operation. A vacuum is sequentially drawn through the male vacuum mold 66 as is hereinafter described in connection with FIGS. 6-8 to form the sheet 34 of virgin polyethylene terephthalate to the shape of the male mold surface 86 and thereby forms the liner for the blow molding preform as previously described. The curved shape of the sheet 34 of virgin polyethylene terephthalate as shown in FIG. 5 provides preforming before the forming provided by the male vacuum mold 66 and results in a thinner liner adjacent the distal end 90 of the mold surface 86. Having the thinner liner at its closed end prevents the liner from acting as an insulator adjacent an injection port when the outer layer of the preform is injection molded. Thus, there is no heat insulating effect that would maintain heat from the injection molded outer layer in a manner that tends to cause crystallinity to the outer layer as well as to the liner. This lack of crystallinity thus provides a stronger more effective blow molded container.

Figure 6:
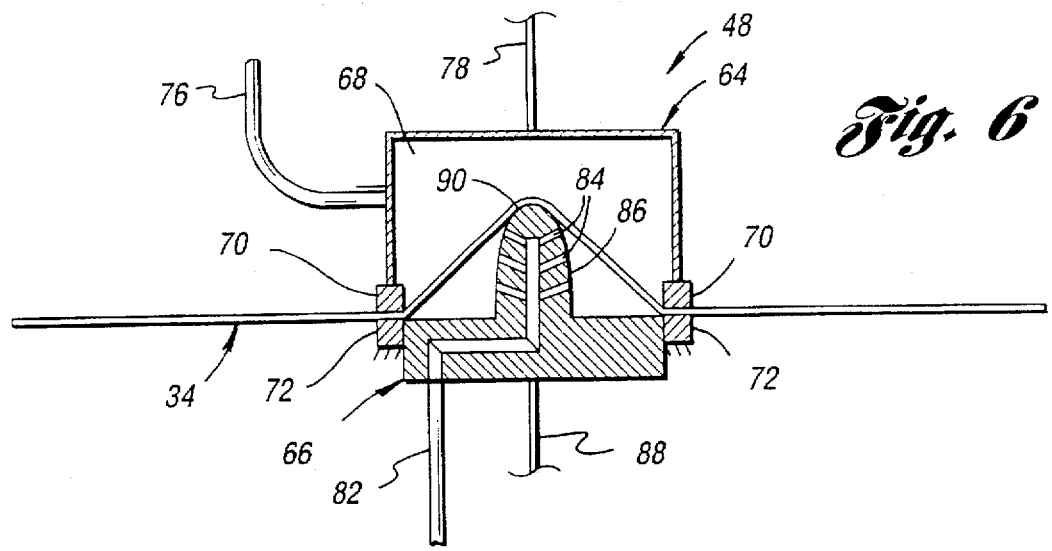
FIG. 6 is a partial view of FIG. 5 at a still further stage of the thermoforming cycle.
Figure 7:
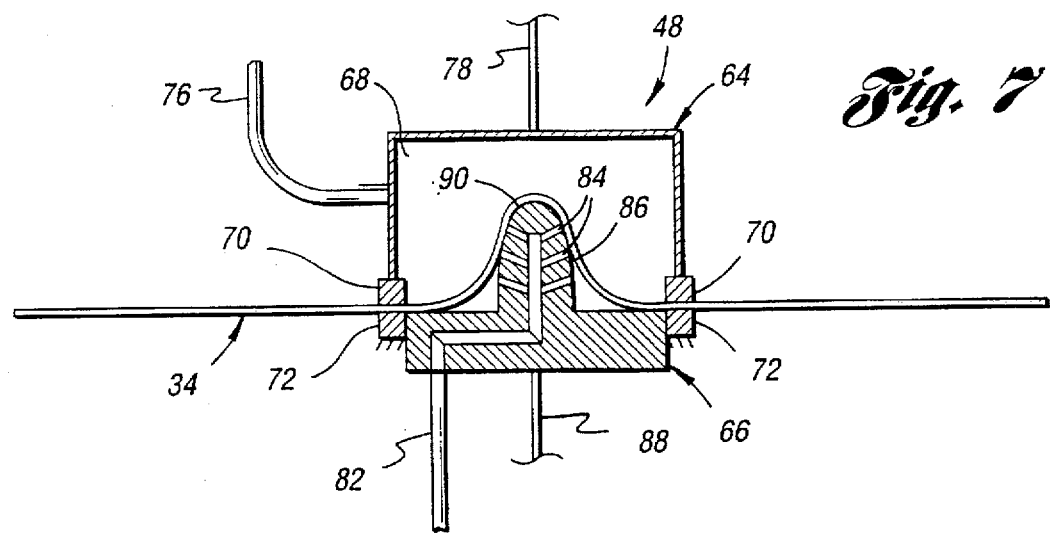
FIG. 7 is a view similar to FIG. 6 but at a yet still further stage of the thermoforming cycle.
Figure 8:
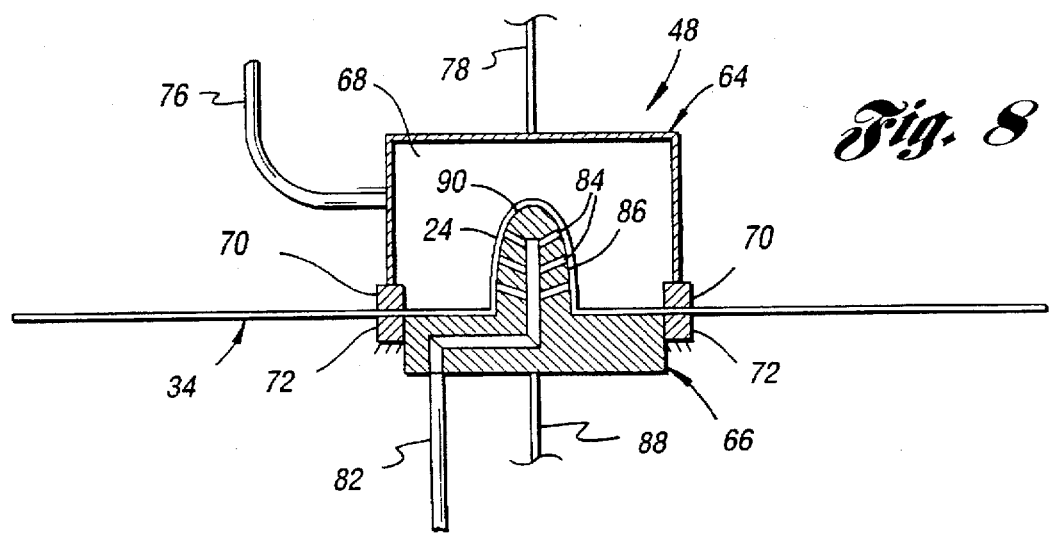
FIG. 8 is a view similar to FIG. 7 after completion of the thermoforming cycle to provide a preform liner for blow molding.

With reference to FIG. 6, the vacuum provided within the vacuum chamber 68 of the vacuum enclosure 64 is maintained after the initial engagement of the male vacuum mold 66 with the sheet 34 of virgin polyethylene terephthalate and while the male vacuum mold is thereafter moved to form the heated sheet of resin as shown in FIG. 6. The upward movement of the male vacuum mold 66 under the operation of actuator 88 is then terminated and the vacuum drawn at the vacuum chamber 68 of vacuum enclosure 54 is terminated. This termination of the vacuum within the vacuum chamber 68 causes the sheet 34 of virgin polyethylene terephthalate to further deform to the shape of the male vacuum mold 66 as shown in FIG. 7 even before the vacuum is drawn through the male vacuum mold 66. Drawing of the vacuum through the male vacuum mold 66 by the conduit 72 communicated with the mold passages 84 conforms the sheet 34 of virgin polyethylene terephthalate to the mold surface 86 as shown in FIG. 8.

With reference to FIG. 9, the trimming station 50 includes a trimming member 92 moved by an actuator 94 toward and away from a lower support surface 96 over which the formed liner 24 is moved with the rest of the sheet 34 of virgin polyethylene terephthalate downstream from the thermoforming station described above. Downward movement of the trimming member 92 under the operation of actuator 94 engages a lower sharpened edge 98 thereof with the sheet 34 of virgin polyethylene terephthalate around the liner 24 to cut the liner from the rest of the sheet 34 of virgin polyethylene terephthalate which then is received by the scrap roll 40 as previously described.

After the trimming operation illustrated in FIG. 9, the liner 24 is transferred to the injection mold 32 shown in FIG. 2 for injection molding of the outer layer 26 to complete the manufacturing of the blow molding preform 10' prior to blow molding thereof within the mold 22 illustrated in FIG. 1 to provide the multi-layer blow molded container 10.

The multi-layer blow molded container 10 shown in FIG. 1 advantageously can have an outer layer of resin 26 with sufficient resin such that the outer layer by weight constitutes at least 75% of the total weight of the container. More preferably, the outer layer by weight constitutes over 85% of the total weight of the container and, most preferably, constitutes about 88% to 92% of the total weight of the container with 90% being optimal. This great amount of the injection molded outer layer is possible because the liner is thermoformed and, according to the method involved, can have this thermoforming performed without crystallinity at the center 21 of the freestanding base 18 of the container as described above.

While the best most modes for carrying out the invention have been described in detail, those familiar with the art to which this invention relates will recognize various alternative ways of practicing the invention as described by the following claims.

What is claimed is:

1. A method for making a multi-layer blow molded container comprising:

spraying a pattern of barrier layer spots onto a sheet of virgin polyethylene terephthalate so as to cover less than the entire sheet;

thermoforming the sheet of polyethylene terephthalate at each barrier layer spot to provide a preform liner having a virgin polyethylene terephthalate layer and a barrier layer;

injection molding an outer layer of polyethylene terephthalate around the exterior of the liner to provide a multi-layer preform; and blow molding the multi-layer preform to provide the multi-layer blow molded container.

2. A method for making a multi-layer blow molded container as in claim 1 wherein the barrier layer spots are provided to the sheet of virgin polyethylene terephthalate at spaced locations from each other.

3. A method for making a multi-layer blow molded container as in claim 1 wherein the barrier layer spots are selected from the group consisting of polyethylene naphthalate, polyvinylidene chloride, nylon, ethylene-vinyl alcohol and combinations of these materials.

4. A method for making a multi-layer blow molded container as in claim 1 wherein the virgin polyethylene terephthalate layer is positioned to define the interior surface of the blow molded container and cooperates with the injection molded outer layer of polyethylene terephthalate to sandwich the barrier layer therebetween.

5. A method for making a multi-layer blow molded container as in claim 1 wherein the barrier layer is positioned to define the interior surface of the blow molded container and cooperates with the injection molded outer layer of polyethylene terephthalate to sandwich the virgin polyethylene terephthalate layer therebetween.

6. A method for making a multi-layer blow molded container as in claim 1 wherein a second sheet of resin is provided to cooperate with the sheet of virgin polyethylene terephthalate to sandwich the barrier layer spots therebetween in preparation for the thermoforming of the liner.

7. A method for making a multi-layer blow molded container as in claim 6 wherein the second sheet of resin utilized is selected from the group consisting of polyethylene terephthalate and polyethylene naphthalate and wherein the second sheet of resin utilized is of the type selected from the group consisting of virgin resin and post consumer recycled resin.

8. A method for making a multi-layer blow molded container as in claim 1 wherein virgin polyethylene terephthalate is injection molded around the preform liner.

9. A method for making a multi-layer blow molded container as in claim 1 wherein post consumer recycled polyethylene terephthalate is injection molded around the preform liner to provide the preform.

10. A method for making a multi-layer blow molded container as in claim 1 wherein the preform is axially stretched to provide biaxial orientation of the multi-layer blow molded container.

11. A method for making a multi-layer blow molded container comprising:

spraying a pattern of barrier layer spots of polyethylene napthalate onto a sheet of virgin polyethylene terephthalate so as to cover less than the entire sheet;

thermoforming the sheet of polyethylene terephthalate at each barrier layer spot of polyethylene napthalate to provide a preform liner having a virgin polyethylene terephthalate layer and a barrier layer of polyethylene napthalate;

injection molding an outer layer of polyethylene terephthalate around the exterior of the liner to provide a multi-layer preform; and blow molding the multi-layer preform to provide the multi-layer blow molded container.

12. A method for making a multi-layer blow molded container comprising:

spraying a pattern of barrier layer spots of polyethylene napthalate onto a sheet of virgin polyethylene terephthalate so as to cover less than the entire sheet;

thermoforming the sheet of polyethylene terephthalate at each barrier layer spot of polyethylene napthalate to provide a preform liner having an inner layer of virgin polyethylene terephthalate layer and an outer barrier layer of polyethylene napthalate;

injection molding an outer layer of post consumer recycle polyethylene terephthalate around the exterior of the liner to provide a multi-layer preform; and blow molding the multi-layer preform to provide the multi-layer blow molded container.

* * * * *